(12) United States Patent
Zhou et al.

(10) Patent No.: US 7,577,314 B2
(45) Date of Patent: Aug. 18, 2009

(54) METHOD AND APPARATUS FOR GENERATING A PANORAMA BACKGROUND FROM A SET OF IMAGES

(75) Inventors: Hui Zhou, Toronto (CA); Alexander Sheung Lai Wong, Scarborough (CA)

(73) Assignee: Seiko Epson Corporation, Tokyo (JP)

( * ) Notice: Subject to any disclaimer, the term of this patent is extended or adjusted under 35 U.S.C. 154(b) by 744 days.

(21) Appl. No.: 11/398,800

(22) Filed: Apr. 6, 2006

(65) Prior Publication Data

US 2007/0237422 A1 Oct. 11, 2007

(51) Int. Cl.
*G06K 9/36* (2006.01)

(52) U.S. Cl. .................. 382/284; 382/264; 382/268; 345/629

(58) Field of Classification Search .......... 345/611, 345/629, FOR. 156, 216; 348/36, 420.1, 348/FOR. 136, 137; 358/3.27; 382/264, 382/267, 268, 284
See application file for complete search history.

(56) References Cited

U.S. PATENT DOCUMENTS

| | | | |
|---|---|---|---|
| 5,812,787 A | 9/1998 | Astle | |
| 5,915,044 A | 6/1999 | Gardos et al. | |
| 5,943,445 A | 8/1999 | Dufaux | |
| 6,249,613 B1 | 6/2001 | Crinon et al. | |
| 6,307,550 B1 | 10/2001 | Chen et al. | |
| 6,751,350 B2 * | 6/2004 | Crinon et al. | 382/173 |
| 6,977,664 B1 * | 12/2005 | Jinzenji et al. | 345/629 |
| 2002/0130958 A1 | 9/2002 | Simon et al. | |
| 2003/0174773 A1 | 9/2003 | Comaniciu et al. | |
| 2004/0095374 A1 | 5/2004 | Jojic et al. | |
| 2004/0114799 A1 | 6/2004 | Xu | |
| 2004/0126014 A1 | 7/2004 | Lipton et al. | |
| 2004/0131249 A1 | 7/2004 | Sandrew | |
| 2004/0264793 A1 | 12/2004 | Okubo | |
| 2007/0279494 A1 * | 12/2007 | Aman et al. | 348/169 |

* cited by examiner

*Primary Examiner*—Matthew C Bella
*Assistant Examiner*—Gregory F Cunningham

(57) ABSTRACT

A method of generating a panorama background from a set of images comprises dividing each of the images into blocks and comparing color-space features of corresponding blocks of the images to select background blocks. The selected background blocks are merged to generate the panorama background. An apparatus and computer readable medium embodying a computer program for generating a panorama background are also provided.

33 Claims, 7 Drawing Sheets

METHOD AND APPARATUS FOR GENERATING A PANORAMA BACKGROUND FROM A SET OF IMAGES

FIELD OF THE INVENTION

The present invention relates generally to image processing and in particular, to a method, apparatus and computer-readable medium embodying a computer program for generating a panorama background from a set of images.

BACKGROUND OF THE INVENTION

The generation of a panorama background from a set of still images or a sequence of video frames (collectively "images") is known. Stationary content from the images of the set relating to the same physical scene at a plurality of different time instances, viewpoints, fields of view, resolutions, and the like (that is, "background") is melded to form a single, wider angle background image (or "panorama background"). Panorama background generation is very useful in many applications, ranging from object tracking in surveillance systems, to noise reduction for weather pattern analysis and astronomical surveying.

Panorama background generation is a specific form of panorama generation, wherein foreground objects moving across the image background are treated as noise and removed. In order to generate a panorama background, the images of the set are geometrically and/or colorimetrically registered and aligned, and stationary portions of the images in the set are then identified and merged or stitched together to form a view of the scene as a single coherent panorama background. During registration, each image is analyzed to determine if it can be matched with one or more previously analyzed images. A transformation model between the image and a reference image is determined and then the image is warped to the other images to remove or minimize the offset.

There are a number of issues that must be taken into account during the generation of a panorama background in order to ensure a good resultant image. Background motion requires tolerance to image misalignments, which is not a major concern for most object tracking and surveillance algorithms making these algorithms unsuitable for panorama background generation. In panorama background generation, background movements can be relatively large and thus, tolerance to image misalignment is required. Therefore, a more flexible approach is typically required to provide greater tolerance to such image misalignment.

In general, during panorama background generation, it is often very hard to obtain clean pictures of landscapes and landmarks due to the noise introduced by moving foreground objects. For example, taking clean pictures of a park for panorama background generation can often be difficult due to the large number of people moving in front of the camera. Current techniques of panorama background generation commonly suffer from problems such as "ghosting", where movement of foreground objects within overlapping parts of images results in the foreground object having a ghosted look in the final composite panorama background. Therefore, it is important to extract only the background content of images in order to create a high quality, clean panorama background.

A number of panorama background generation methods have been proposed. For example, the publication entitled "Adaptive Color Background Modeling for Real-Time Segmentation of Video Streams", by Francois et al., Proceedings of the International Conference on Imaging Science, Science and Technology, 1999, pp. 227-232, proposes an algorithm where the panorama background is modeled from a number of background frames in HSV color-space and subtracted from noisy frames based on the mean value and covariance of each pixel of the static background model. The publication entitled "Foreground Object Detection From Videos Containing Complex Background", by Li et al, Proceedings of the $11^{th}$ ACM International Conference on Multimedia, 2003, pp. 2-10, proposes the use of a general Bayesian framework where a number of features are used to model the background for foreground object detection. The main problem that these panorama background generation methods share is that they are primarily designed for object-tracking purposes and are thus, not concerned with the quality of the resultant background content.

A number of slower but more accurate algorithms have been proposed for generating higher quality panorama backgrounds. For example, one such panorama background generation algorithm makes use of an exact pixel selector that compares images pixel-by-pixel to isolate the background from the foreground. Unfortunately, these more accurate panorama background generation methods are inflexible, require that no noise be present in the images of the set (thus making them impractical for real-life situations), and yield poor results when only a relatively small image set is available (which is common in many panorama background generation situations). In addition, these panorama background generation methods are computationally expensive, especially when a large number of images is processed.

A basic assumption with all of the above panorama background generation methods is that the background itself is stationary amongst all images. As a result, these methods are generally intolerant to image misalignments and distortion, making these methods unsuitable for panorama background generation in situations where the background itself is in motion relative to the camera.

A number of deghosting algorithms are available specifically for panorama background generation purposes. The publication entitled "Construction of Panoramic Image Mosaics with Global and Local Alignment", by Shum et al., International Journal of Computer Vision, Volume 36, pp. 101-130, 2000, proposes a method for eliminating ghosts based on computing optical flow and then performing a multi-way morph. However, this method is effective only for correcting minor motion changes. The publication entitled "Eliminating Ghosting and Exposure Artifacts in Image Mosaics", by Szeliski et al., IEEE Computer Society Conference on Computer Vision and Pattern Recognition, 2001, proposes a technique where a vertex cover algorithm is used to selectively remove all but one instance of each object in the overlapping part, thus eliminating ghosting that results when blending multiple images in overlapping areas. However, there is a problem to this approach, and with deghosting methods in general. Most deghosting algorithms require the selection of a reference image to eliminate the need to blend overlapping parts and are generally concerned with eliminating or reducing ghosting rather than generating a clean panorama background.

As will be appreciated from the above discussion, improvements in the generation of panorama backgrounds from a set of images are desired. It is therefore an object of the present invention to provide a novel method, apparatus and computer-readable medium embodying a computer program for generating a panorama background from a set of images.

SUMMARY OF THE INVENTION

Accordingly, in one aspect there is provided a method of generating a panorama background from a set of images, comprising:

dividing each of said images into blocks;

comparing color-space features of corresponding blocks of said images to select background blocks; and merging said selected background blocks to generate said panorama background.

In one embodiment, a color-space feature vector is generated for each of the blocks. For each block in each image, the color-space feature vector is compared with the color-space feature vector associated with corresponding blocks of other images and the block whose color-space feature vector is most similar to those of the corresponding blocks of other images is selected.

Prior to the comparing, blocks in the images that contain a threshold amount of image data are identified and the identified blocks are examined to determine those that represent background. The comparing and merging is performed using only the identified background blocks.

During the comparing, the color-space feature vectors of corresponding blocks of the images are compared and a representative block is selected from each group of corresponding blocks to generate a preliminary background model. The preliminary background model and the images are divided into alternate blocks and the alternate blocks of the preliminary background model are compared to corresponding alternate blocks of the images. Background blocks are selected from the alternate blocks of the images. The selected background blocks are more similar to the alternate blocks of the preliminary background model than others of the alternate blocks.

According to another aspect, there is provided a method of generating a background from a set of images, comprising:

dividing each of said images into blocks having overlapping regions;

selecting preferred ones of said blocks;

merging said selected preferred blocks; and smoothing overlapping regions of said selected preferred blocks to generate said background.

In one embodiment, the blocks in the images are compared to determine the blocks that are more similar to corresponding blocks in other images and those blocks are selected. In particular, color-space feature vectors of the blocks are compared.

According to yet another aspect, there is provided an apparatus for generating a panorama background from a set of images, comprising:

an image divider dividing each of said images into blocks;

an image comparator comparing color-space features of corresponding blocks of said images to select background blocks; and a stitcher merging said selected background blocks to generate said panorama background.

According to yet another aspect, there is provided an apparatus for generating a panorama background from a set of images, comprising:

an image divider dividing each of said images into blocks having overlapping regions;

an image selector selecting preferred ones of said blocks; and a stitcher generating said panorama background by merging said selected preferred blocks and smoothing overlapping regions of said selected preferred blocks.

According to yet another aspect, there is provided a computer-readable medium including a computer program for generating a panorama background from a set of images, said computer program comprising:

computer program code for dividing each of said images into blocks;

computer program code for comparing color-space features of corresponding blocks of said images to select background blocks; and computer program code for merging said selected background blocks to generate said panorama background.

According to still yet another aspect, there is provided a computer-readable medium embodying a computer program for generating a panorama background from a set of images, comprising:

computer program code for dividing each of said images into blocks having overlapping regions;

computer program code for selecting preferred ones of said blocks; and computer program code for generating said panorama background by merging said preferred blocks and smoothing overlapping regions of said selected preferred blocks.

The panorama background generation method and apparatus provide a fast and robust approach for extracting static content from images for the purpose of generating panorama backgrounds. By comparing blocks of images, better tolerance to image misalignment and noise that may lead to poor image quality is achieved. In addition, time is saved by processing the statistics of blocks of images as those blocks potentially containing static content can be quickly identified for further analysis without performing more complex calculations. As complete blocks of images are employed to construct the panorama background, ghosting is reduced. Further, by selecting overlapping blocks to construct a final background model and smoothing the overlapping regions of the selected blocks, a panorama background is obtained with little visual distortion between blocks, if any. In addition, by using blocks of different sizes and/or placement firstly to generate a preliminary background model and then to generate a final background model, errors arising during the selection of the preliminary panorama background image can be mitigated during generation of the final background model.

BRIEF DESCRIPTION OF THE DRAWINGS

Embodiments will now be described more fully with reference to the accompanying drawings in which.

DETAILED DESCRIPTION OF THE EMBODIMENTS

In the following description, an embodiment of a method and apparatus for generating a panorama background from a set of images is provided. During the method, each image in the set is registered spatially to its adjacent images in the set and the registered images are transformed. The transformed images are then divided into blocks. Using hue feature vector analysis of the blocks, those blocks that are relatively dissimilar to other blocks are discounted as representing background. XYZ color-space feature vectors determined for the remaining blocks are used to identify the blocks that are most similar to corresponding blocks in other images. These identified blocks are used to generate a preliminary background model. A similar XYZ color-space feature vector analysis is performed on larger, overlapping blocks of the transformed images to select blocks most closely matching those of the preliminary background model. These larger overlapping blocks are used to generate a final background model. The overlapping regions of the larger blocks forming the final background model are then smoothed to yield the panorama background.

Figure 1:
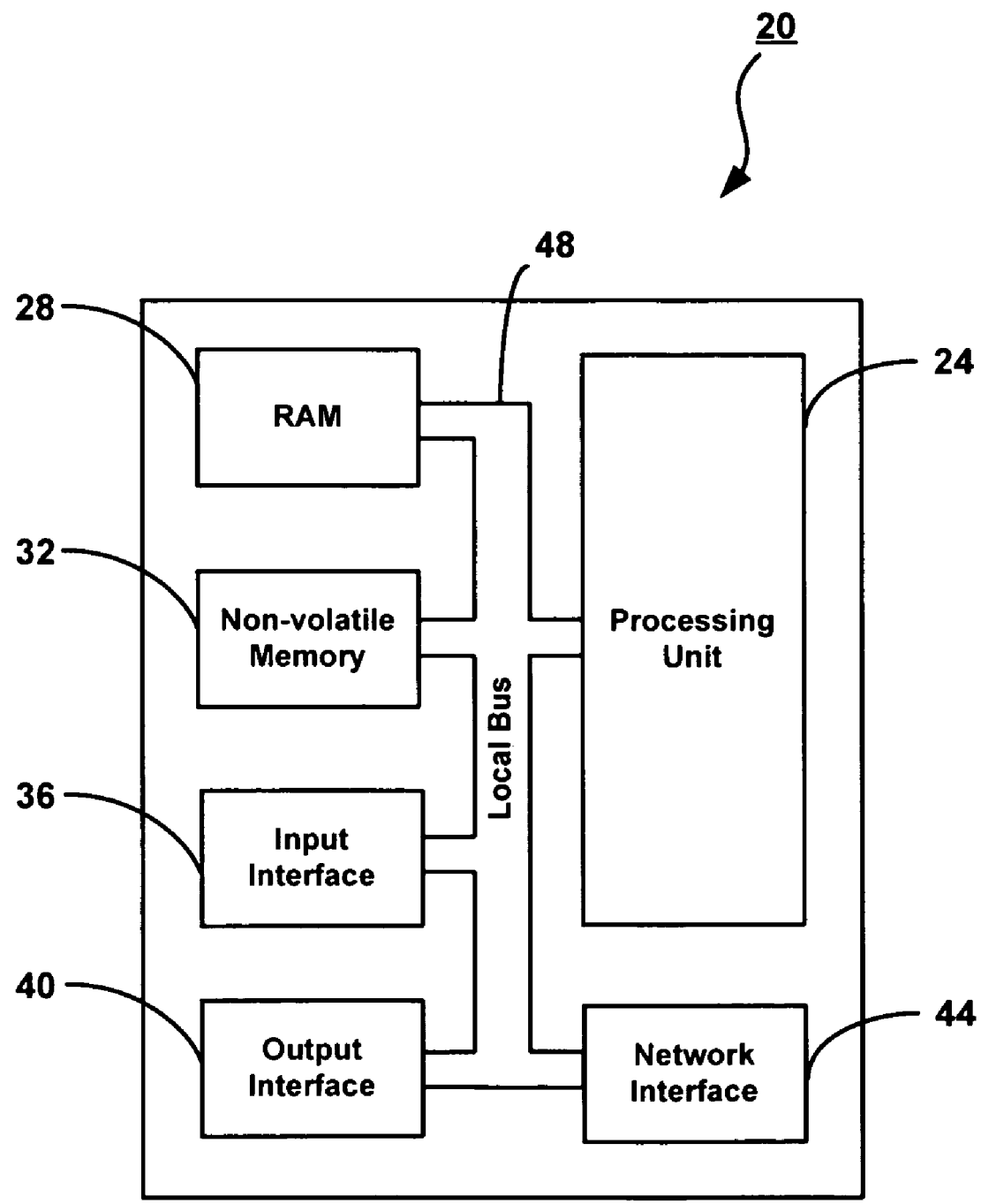
FIG. 1 is a schematic representation of a computing device for generating a panorama background from a set of images.

Turning now to FIG. 1, a computing device 20 for generating a panorama background from a set of images is shown. As can be seen, the computing device 20 comprises a processing unit 24, random access memory ("RAM") 28, non-volatile memory 32, an input interface 36, an output interface 40 and a network interface 44, all in communication over a local bus 48. The processing unit 24 retrieves a panorama background generation application for generating panorama backgrounds from the non-volatile memory 32 into the RAM 28. The panorama background generation application is then executed by the processing unit 24. The non-volatile memory 32 can store a set of images from which one or more panorama backgrounds are to be generated, and can also store the generated panorama backgrounds themselves. The input interface 36 includes a keyboard and mouse, and can also include a video interface for receiving video frames. The output interface 40 can include a display for presenting information to a user of the computing device 20 to allow interaction with the panorama background generation application. The network interface 44 allows images and panorama backgrounds to be sent and received via a communication network to which the computing device 20 is coupled.

Figure 2:
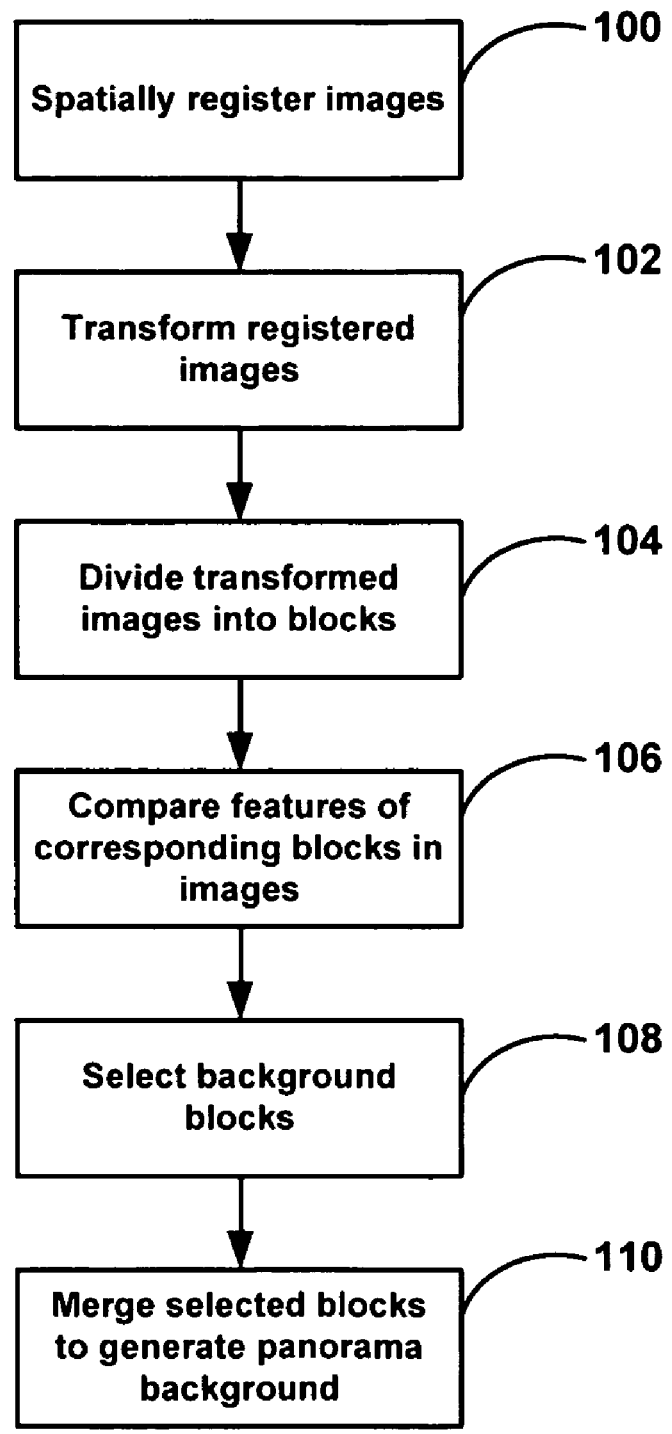
FIG. 2 is a flowchart showing the general steps performed during generation of a panorama background from a set of images.
Figure 3:
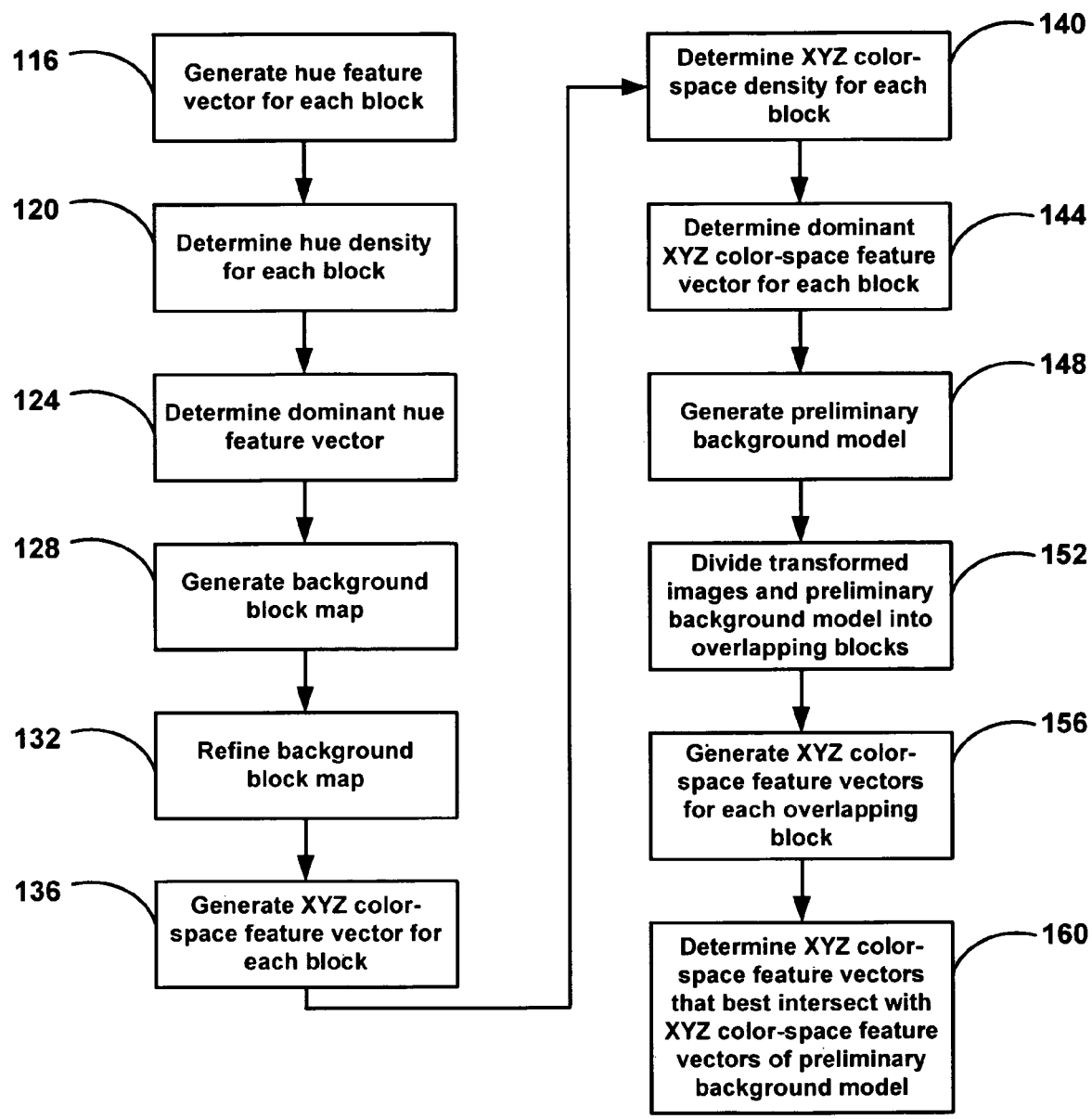
FIG. 3 is another flowchart showing steps performed during generation of a panorama background from a set of images.

FIG. 2 illustrates the general steps performed by the computing device 20 during execution of the panorama background generation application. When an input set of images is to be processed to generate a panorama background, the images in the set are registered spatially with one another (step 100). Once registered, corresponding transformed images are generated (step 102). The transformed images are then divided into blocks (step 104). Features of corresponding blocks in the transformed images are compared (step 106) and background blocks are selected (step 108). The selected background blocks are then merged to generate the panorama background (step 110). Further specifics of the above-identified method will now be described with reference to FIGS. 2 to 8.

During step 100, a reference image is chosen from the set of images. Each image in the set is then registered with its adjoining images using a feature-based registration approach. In this embodiment, a corner matching registration technique is used such as that disclosed in U.S. Patent Application Publication No. US2005/0063608 to Clarke et al., the content of which is incorporated herein by reference. As a result, the corners in adjoining images of the set are registered. A projective transform is then estimated based on the matching corners in each pair of adjoining images resulting in transformation matrices that project each image onto its adjoining image and hence, onto the reference image. The transformation matrices are stored in memory.

Figure 4:
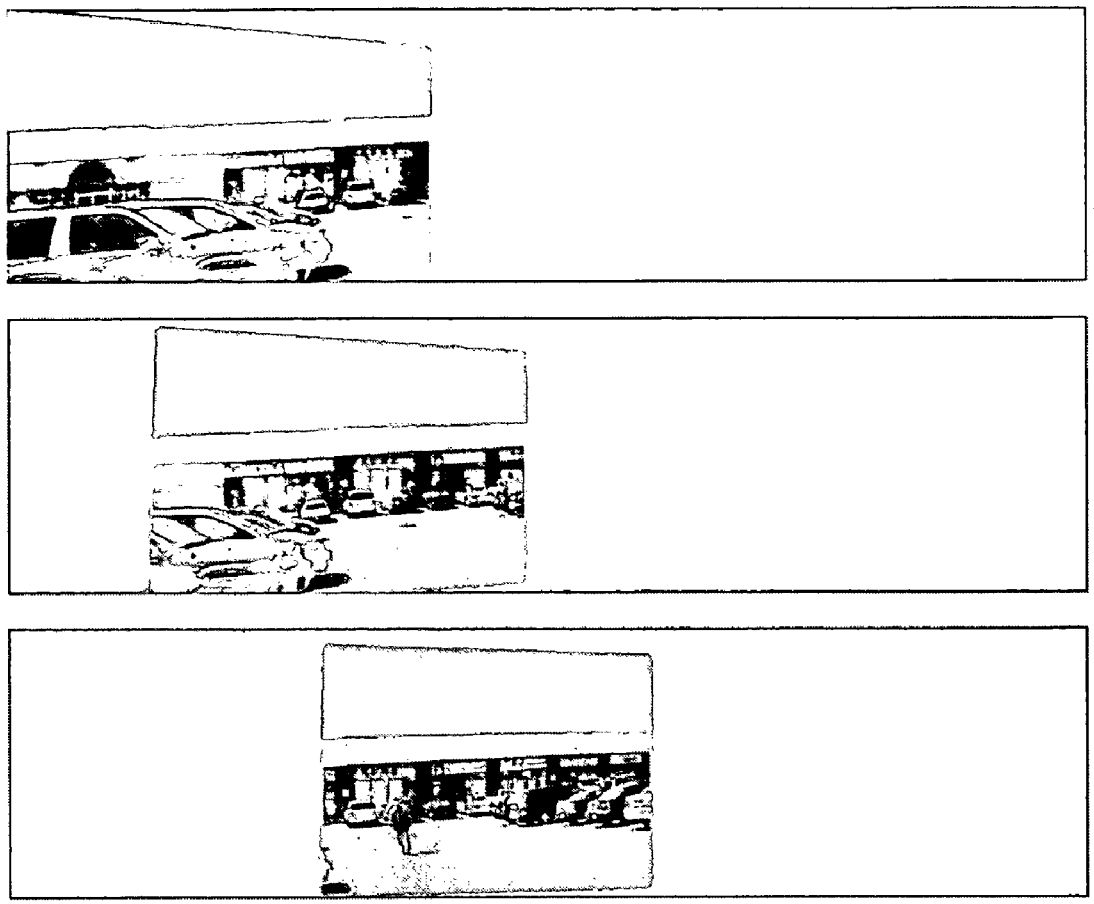
FIG. 4 illustrates a set of images that have been transformed and placed on a matte field.
Figure 5:
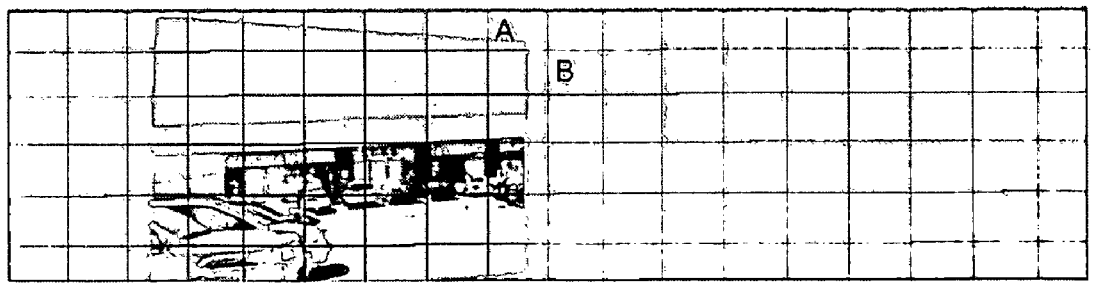
FIG. 5 illustrates one of the transformed images of FIG. 4 after division into blocks.
Figure 6:
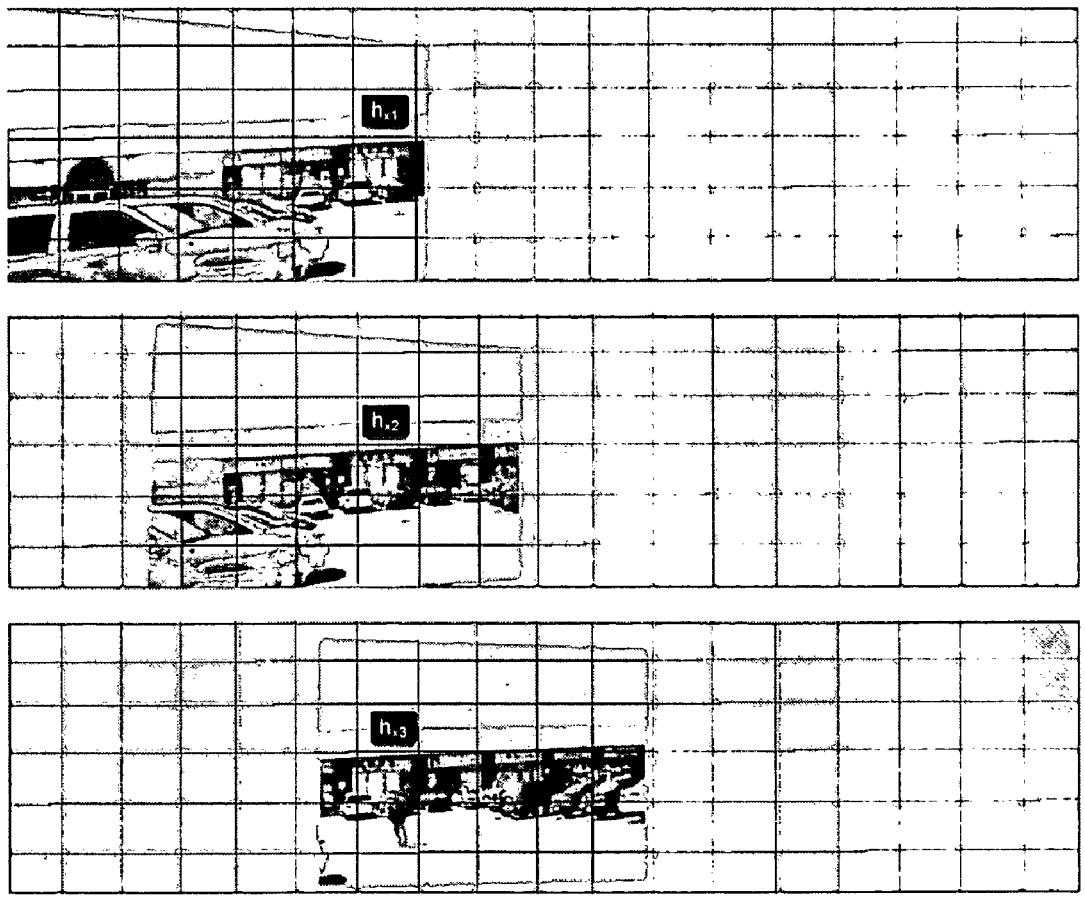
FIG. 6 illustrates all of the transformed images of FIG. 4 after division into blocks and identifies one set of corresponding blocks.

During step 102, each registered image is transformed using its associated transformation matrix and placed on a matte field so that corresponding corners in the transformed images are positioned at the same locations within their respective matte fields as shown in FIG. 4. The transformed images on the matte fields are then examined to determine the rectangular workspace required to fit all of the transformed images into a single image. Following step 102, the transformed images are divided into blocks (step 104). During this process, each transformed image is divided into N blocks of thirty-two (32) pixels by thirty-two (32) pixels, starting from the top left-hand corner of the transformed image. The blocks of each transformed image are then examined to determine the image content therein. Blocks that contain little image content information are labeled as matte field since they have little impact on panorama background generation. Specifically, blocks that include 20% or less image pixels are labeled as matte field and are not considered for further processing. The remaining blocks are labeled as image blocks. FIG. 5 illustrates the transformed middle image of FIG. 4 after division into blocks. The blocks marked 'A' and 'B' are labeled as matte field as they contain little image information.

With the transformed images divided into blocks and the image blocks identified, features of the image blocks are compared. During this process, a hue feature vector is generated for each image block (see step 116 in FIG. 3). During hue feature vector generation, the pixels of each image block are sorted based on hue value and are used to populate a histogram having forty-eight (48) bins, each bin representing a different hue graduation. The hue density for each image block of each transformed image is then determined (step 120). Assuming there are M transformed images, for each transformed image, there is a total of N image blocks and each image block in each transformed image has K corresponding image blocks in other transformed images. It will be appreciated that K is equal to or less than (M−1) as corresponding image blocks in other transformed images may be labeled as matte field and not considered for processing. As mentioned above, a hue feature vector is calculated for each image block. Each hue feature vector is denoted as $\{h_{ij}\}$, where i=1~N, and j=1~K. For each image block, its hue density D{hij} is calculated based on the hue feature vector subset Cij, which includes the hue feature vectors associated with the corresponding image blocks in other transformed images but excludes the hue feature vector $\{hij\}$. Thus, the hue feature vector subset Cij includes K hue feature vectors. The hue density D{hij} is defined as:

$$D\{h_{ij}\} = \frac{\sum_{h_{im} \in C_{ij}} I(\{h_{ij}\}, \{h_{im}\})}{K}, \quad \text{(Eq. 1)}$$

where:

$$I(\{h_1\}, \{h_2\}) = \frac{\sum_{i=1}^{e} \min(h_1(i), h_2(i))}{\max(A_{h1}, A_{h2})}$$

is the generalized expression of the similarity intersection, and where:

K is the number of hue feature vectors in hue feature vector subset $C_{ij}$;

e is the total number of populated bins of the hue feature vector; and $A_{h1}$ and $A_{h2}$ are the total cumulative sum of populated bin values in hue feature vectors $\{h_1\}$ and $\{h_2\}$ respectively.

With the hue density D{hij} calculated for each image block, the dominant hue feature vector for each set of corresponding image blocks $C_i$ is determined (step 124). The dominant hue feature vector is defined as the hue feature vector in the set of hue feature vectors {hi1, hi2, . . . hij}, j=1~(K+1) having the highest hue density value. As an example, for the three hue feature vectors hx1, hx2 and hx3 shown in FIG. 6, hue feature vector hx1 is identified as the dominant hue feature vector as it has the highest hue density value. It should be appreciated that for each set of corresponding image blocks, one and only one hue feature vector is chosen as the dominant hue feature vector. If it happens that there are two or more hue feature vectors with similar highest hue density values, one of the hue feature vectors is arbitrarily chosen as the dominant hue feature vector.

A background block map is then generated for each transformed image based on the similarity between the hue feature vectors associated with the image blocks and the dominant hue feature vectors associated with the image blocks (step 128). The similarity between a hue feature vector and the dominant hue feature vector for a particular image block is determined using the similarity intersection defined below:

$$I(\{h_x\}, \{h_D\}) = \frac{\sum_{i=1}^{e} \min(h_x(i), h_D(i))}{\max(A_{hx}, A_{hD})} \quad \text{(Eq. 2)}$$

where e is the total number of populated bins of the hue feature vector $h_x$;

$A_{hx}$ and $A_{hD}$ are the total cumulative sum of populated bin values in hue feature vectors $\{h_x\}$ and $\{h_D\}$ respectively, where $\{h_D\}$ is the dominant hue feature vector and $\{h_x\}$ is the hue feature vector of the image block under analysis.

The image blocks in each transformed image for which similarity values greater than a threshold percent are generated, are initially labeled as representing background (that is, representing stationary content) while the rest of the image blocks are labeled as representing foreground (that is, representing transient content). A similarity threshold of 60% has been found to be satisfactory.

Figure 7A:
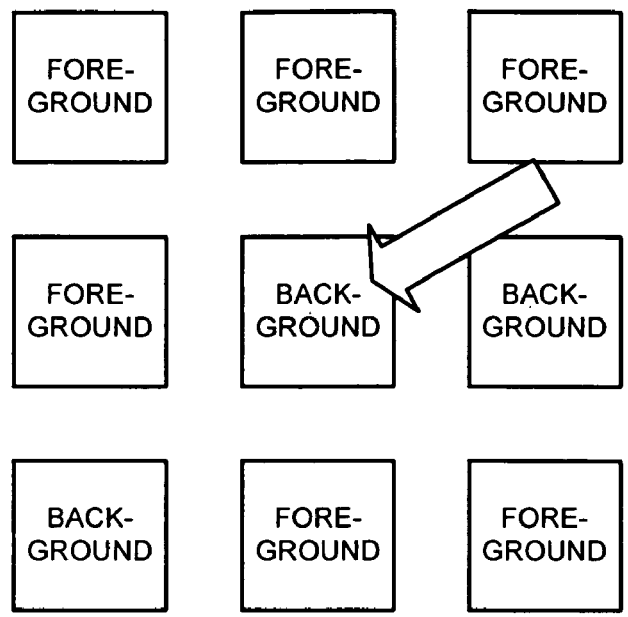
FIGS. 7A and 7B illustrate two scenarios where a block is relabeled as image data or matte field based on the labeling of neighbor blocks.
Figure 7B:
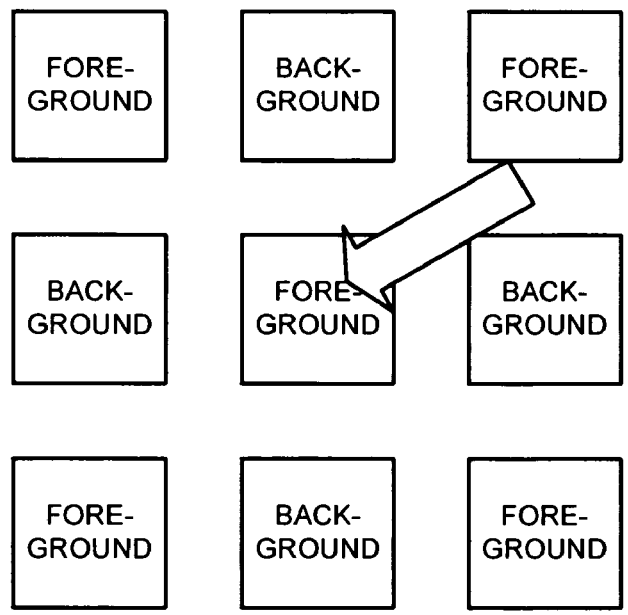

The background block maps are then refined using information from neighboring image blocks (step 132). During the refining, if an image block is labeled as background and less than four of its neighboring image blocks are labeled as background, then the image block is relabeled as foreground in the background block map. An example of this is shown in FIG. 7A. Also, if an image block is labeled as foreground and none of its top, left, right, and bottom neighboring image blocks are labeled as foreground, then the image block is relabeled as background. As will be appreciated an image block labeled as foreground is very likely to be incorrectly labeled if it is completely surrounded by image blocks labeled as background. An example of this is shown in FIG. 7B.

Once the background block map for each transformed image has been refined, an XYZ color-space feature vector is generated for each image block of each transformed image (step 136). In this embodiment, during XYZ color-space feature vector generation, a 48-bin histogram is employed, with sixteen (16) bins allotted for each of the X, Y and Z channels. In particular, during XYZ color-space feature vector generation, the pixels of each image block are examined to determine their XYZ channel contributions and the contributions are used to populate the bins of the histogram. The XYZ color-space feature vectors associated with the image blocks of each transformed image act as a signature for the purpose of background block selection.

The XYZ color density for each image block of each transformed image is then determined using the XYZ color-space feature vectors (step 140). Determination of the XYZ color densities is carried out in a similar manner to determination of the hue densities. As discussed above, for each transformed image, there is a total of N image blocks and each image block in each transformed image has K corresponding image blocks in other transformed images where K is equal to or less than (M−1). Each image block has one corresponding XYZ color-space feature vector denoted as $\{b_{ij}\}$, where i=1~N, and j=1~(K+1). For each image block, its XYZ color density D{bij} is calculated based on the XYZ color-space feature vector subset Cij, which includes the XYZ color-space feature vectors associated with the corresponding image blocks in other transformed images but excludes the XYZ color-space feature vector $\{b_{ij}\}$. The XYZ color density D{bij} is defined as:

$$D\{b_{ij}\} = \frac{\sum_{b_{im} \in Cij} I(\{b_{ij}\}, \{b_{im}\})}{K}, \quad \text{(Eq. 3)}$$

where:

$$I(\{b_1\}, \{b_2\}) = \frac{\sum_{i=1}^{e} \min(b_1(i), b_2(i))}{\max(A_{b1}, A_{b2})}$$

is the generalized expression of the similarity intersection, and where:

K is the number of XYZ color-space feature vectors in XYZ color-space vector subset $C_{ij}$;

e is the total number of populated bins of the XYZ color-space feature vector; and Ab1 and Ab2 are the total cumulative sum of populated bin values in XYZ color-space feature vectors $\{b_1\}$ and $\{b_2\}$ respectively.

For each image block in the transformed image that has been labeled as foreground in the background block map, the calculated XYZ color density is reduced by 50%. With the XYZ color density for each image block calculated, the dominant XYZ color-space feature vector for each set of corresponding image blocks is determined (step 144). The dominant XYZ color-space feature vector is defined as the XYZ color-space feature vector in the set of XYZ color-space feature vectors {bi1, bi2, . . . bij}, j=1~(K+1) having the highest density value. It should be appreciated that for each set of corresponding image blocks, one and only one XYZ color-space feature vector is chosen as the dominant XYZ color-space feature vector. If it happens that there are two or more XYZ color-space feature vectors with similar XYZ color densities, one of XYZ color-space feature vectors is arbitrarily chosen as the dominant XYZ color-space feature vector.

Once the dominant XYZ color-space feature vector for each image block has been determined, a preliminary background model is generated using the image blocks from the transformed images corresponding to the dominant XYZ color-space feature vectors (step 148). Using XYZ color-space feature vectors to select image blocks rather than using hue feature vectors takes into account both chrominance and illumination resulting in image blocks that mesh more closely together for a more consistent look. Hue features are however, very tolerant to illumination variations. By using the knowledge obtained from hue features during the labeling process, the probability of a selected image block being foreground is greatly reduced.

Following step 148, each transformed image and the preliminary background model is divided into overlapping image blocks that are larger than those used during at step 104 (step 152). In particular, the transformed images as well as the preliminary background model are segmented into M overlapping image blocks, where M is less than N. In this embodiment, an overlapping image block size of sixty-four (64) pixels by sixty-four (64) pixels is selected with an overlap of 25%.

Figure 8:
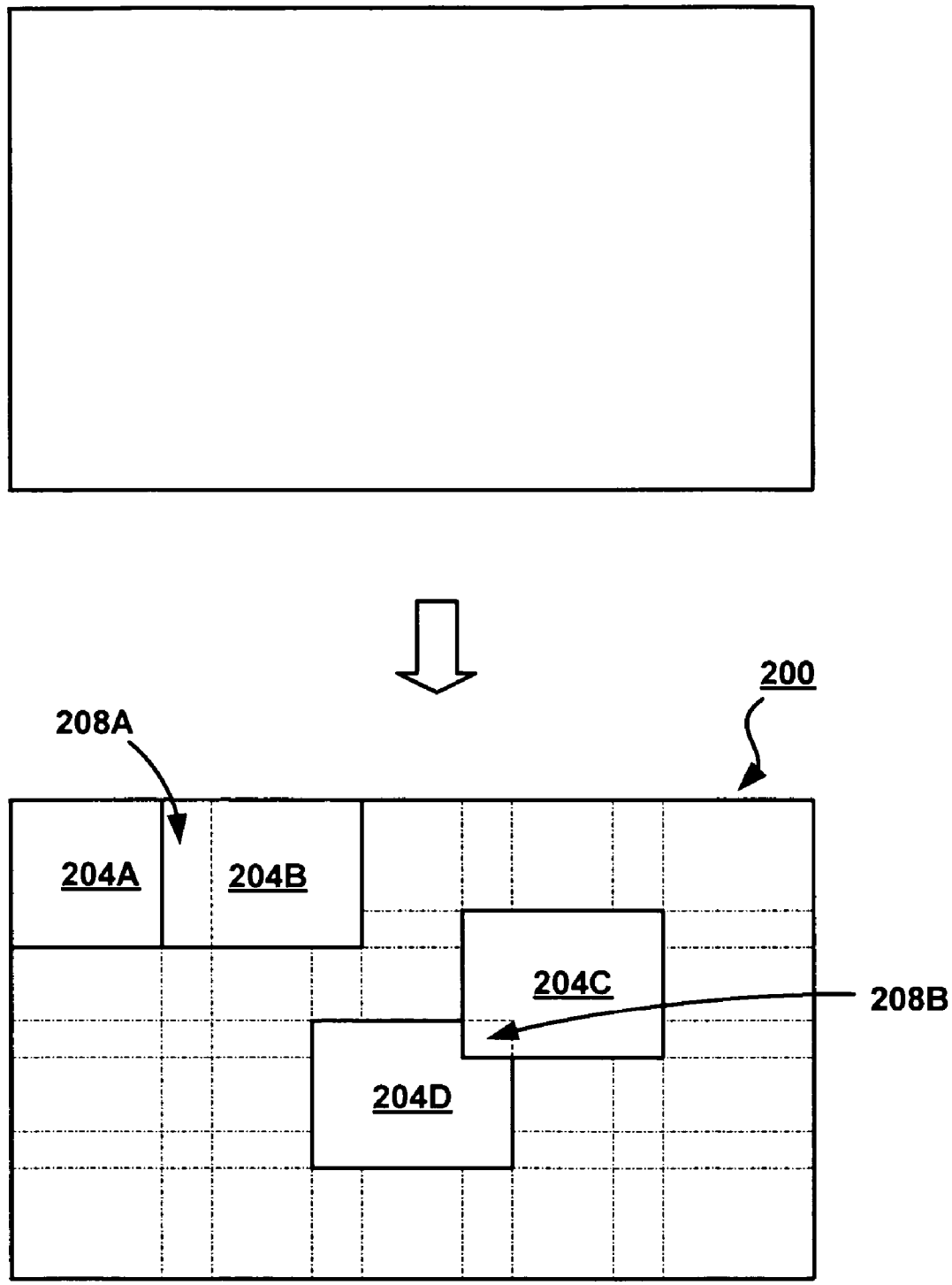
FIG. 8 illustrates the division of a transformed image into a number of overlapping blocks.

FIG. 8 illustrates the division of a transformed image or preliminary background model 200 into overlapping image blocks. For ease of illustration, only four overlapping blocks are highlighted. Image block 204A is shown sharing an overlapping region 208A with neighboring image block 204B. Image block 204C is shown sharing an overlapping region 208B with neighboring image block 204D. As will be appreciated, each image block shares an overlapping region with each of its neighboring image blocks.

For each overlapping image block of the transformed images and the preliminary background model, an XYZ color-space feature vector is generated (step 156). Once again, a 48-bin XYZ color-space feature vector histogram is employed, with sixteen (16) bins for each of the X, Y and Z channels. For each overlapping image block of the preliminary background model, the corresponding image block of each transformed image is examined to determine which corresponding image block has an XYZ color-space feature vector that best intersects with the XYZ color-space feature vector of the preliminary background model image block (step 160). These overlapping image blocks from the transformed images are then selected to generate a final background model (step 108).

As mentioned previously, with the final background model generated, the selected overlapping image blocks are stitched, or merged, and the overlapping regions are blended together (step 110). The overlapping regions of the blocks are blended together using a frequency-based weighted blending technique. In this embodiment, blending is carried out in the manner disclosed in aforementioned U.S. Patent Application Publication No. US2005/0063608 to Clarke et al., the content of which is incorporated herein by reference. In this manner, artifacts caused by mis-registration or noise are reduced. The end result is a panorama background with improved image quality as compared to panorama backgrounds generated using prior art techniques result. If desired, however, a simple blending technique that equally weights image content can be used.

In using overlapping image blocks and a two-step approach to select image blocks, artifacts and noise is significantly reduced. In addition, blending reduces the amount of discontinuity present between neighboring blocks due to the nature of block-based image selection.

As will be appreciated, by using hue as a comparison feature, the image block labeling technique is very tolerant to illumination variations among the images in the set and this leads to better separation between foreground and background. In addition, the use of a density function in distinguishing background objects does not require information from the reference image since the density distribution of the hue feature vectors takes into account the color distributions from all of the images. This in effect leads to better adaptability as no prior information about what constitutes foreground is required to isolate foreground from background. In other words, background is comprised of objects that generally remain at a constant position relative to each other through the set of images, regardless of whether the objects appear or do not appear in any particular image. In this embodiment, image blocks corresponding to the dominant hue feature vectors have the highest probability of being background regardless of whether the image blocks are in the reference image or not.

The above-described embodiment illustrates an apparatus and method of generating a panorama background from a set of images. While the described method uses hue qualities of the image to identify those blocks of the transformed images that most likely represent background, those of skill in the art will appreciate that other qualities of the image can be used to identify the content of the blocks.

While the XYZ color-space is used to select the image blocks of the transformed images to be used to generate the panorama background, other characteristics of the image blocks can be used. For example, other color-spaces such as YUV, YIQ, RGB, etc. can be substituted in place of the XYZ color-space.

In addition, other features of the transformed images can be used to select the image blocks to be used to generate the panorama background. For example, edge or shape features can be used.

Further, while histograms have been employed in the described embodiment, other methods of measuring features of the image blocks can be utilized. For example, feature maps can be used to compare the features of image blocks.

The sizes and shapes of the image blocks can be modified to suit different situations. In addition, the amount of overlap shared by overlapping image blocks can be adjusted as desired.

The transformed images and the preliminary background model can be divided into alternate image blocks that are bigger or smaller than the image blocks used to generate the preliminary background model, and can be offset in placement in respect of those image blocks.

The method and apparatus may be embodied in a software application including computer executable instructions executed by a processing unit such as a personal computer or other computing system environment. The software application may run as a stand-alone digital image editing tool or may be incorporated into other available digital image editing applications to provide enhanced functionality to those digital image editing applications. The software application may comprise program modules including routines, programs, object components, data structures etc. and be embodied as computer-readable program code stored on a computer-readable medium. The computer-readable medium is any data storage device that can store data, which can thereafter be read by a computer system. Examples of computer-readable medium include for example read-only memory, random-access memory, hard disk drives, magnetic tape, CD-ROMs and other optical data storage devices. The computer-readable program code can also be distributed over a network including coupled computer systems so that the computer-readable program code is stored and executed in a distributed fashion.

Although particular embodiments have been described, those of skill in the art will appreciate that variations and modifications may be made without departing from the spirit and scope thereof as defined by the appended claims.

What is claimed is:

1. A method of generating a panorama background from a set of images, comprising:
   dividing each of said images into blocks;
   comparing color-space features of corresponding blocks of said images to select background blocks from foreground and background blocks; and
   merging said selected background blocks to generate said panorama background.

2. The method of claim 1, further comprising prior to said dividing:
   registering said images spatially to each other to determine relative transformations; and
   transforming said images using said relative transformations.

3. The method of claim 1, wherein said comparing comprises:
   generating a color-space feature vector for each of said blocks; and
   for each block in each image, comparing the color-space feature vector thereof with the color-space feature vector associated with corresponding blocks of other images and selecting the block whose color-space feature vector is most similar to those of the corresponding blocks of other images.

4. The method of claim 3, wherein said color-space is the XYZ color-space.

5. The method of claim 1 further comprising prior to said comparing, identifying blocks in each of said images that contain a threshold amount of image data and performing said comparing and merging using only said identified blocks.

6. The method of claim 5 wherein each of said identified blocks comprises greater than 80% image pixels.

7. The method of claim 5, wherein said comparing comprises:
   generating a color-space feature vector for each of said blocks; and
   for each block in each image, comparing the color-space feature vector thereof with the color-space feature vector associated with corresponding blocks of other images and selecting the block whose color-space feature vector is most similar to those of the corresponding blocks of other images.

8. The method of claim 7, wherein said color-space is the XYZ color-space.

9. The method of claim 8, further comprising prior to said dividing:
   registering said images spatially to each other to determine relative transformations; and
   transforming said images using said relative transformations.

10. The method of claim 5 further comprising prior to said comparing, examining the identified blocks to determine those that represent background and performing the comparing and merging using only said identified background blocks.

11. The method of claim 10 wherein during said examining, hue features of identified blocks are compared to determine those that represent background.

12. The method of claim 10 wherein identified background blocks are compared with neighbouring blocks to confirm labeling as background blocks prior to said comparing and merging.

13. The method of claim 12, wherein said comparing comprises:
   generating a color-space feature vector for each of said blocks; and
   for each block in each image, comparing the color-space feature vector thereof with the color-space feature vector associated with corresponding blocks of other images and selecting the block whose color-space feature vector is most similar to those of the corresponding blocks of other images.

14. The method of claim 13, wherein said color-space is the XYZ color-space.

15. The method of claim 1, wherein said comparing comprises:
   comparing said color-space features of corresponding blocks of said images;
   selecting one representative block from each group of corresponding blocks to generate a preliminary background model;
   dividing said preliminary background model and said images into alternate blocks;
   comparing the alternate blocks of said preliminary background model to corresponding alternate blocks of said images; and
   selecting background blocks from said alternate blocks of said images, said selected background blocks being more similar to the alternate blocks of said preliminary background model than others of said alternate blocks.

16. The method of claim 15, wherein said alternate blocks are larger than said blocks.

17. The method of claim 16, wherein said alternate blocks in said images are overlapping.

18. The method of claim 17, further comprising:
   smoothing overlapping regions of said selected background blocks.

19. The method of claim 18, wherein said overlapping regions are smoothed using a weighted blending technique.

20. The method of claim 1, wherein:
   said dividing step includes dividing each of said images into blocks having overlapping regions.

21. The method of claim 20, further comprising:
   smoothing overlapping regions of said selected background blocks to generate said panorama background.

22. An apparatus for generating a panorama background from a set of images, comprising:
   an image divider dividing each of said images into blocks;
   an image comparator comparing color-space features of corresponding blocks of said images to select background blocks from foreground and background blocks; and
   a stitcher merging said selected background blocks to generate said panorama background.

23. The apparatus of claim 22, further comprising:
   an image aligner registering said images spatially to each other to determine relative transformations, and transforming said images using said relative transformations.

24. The apparatus of claim 22, wherein said image comparator generates a color-space feature vector for each of said blocks of said images, compares the color-space feature vector for each block in each image with the color-space feature vector associated with corresponding blocks of other images, and selects the block for each group of corresponding blocks of said images whose color-space feature vector is most similar to those of the corresponding blocks.

25. The apparatus of claim 24, wherein said color-space is the XYZ color-space.

26. The apparatus of claim 22, wherein said image comparator compares said color-space features of corresponding blocks of said images, selects one representative block from each group of corresponding blocks to generate a preliminary background model, divides said preliminary background model and said images into alternate blocks, compares the alternate blocks of said preliminary background model to corresponding alternate blocks of said images, and selects background blocks from said alternate blocks of said images, said selected background blocks being more similar to the alternate blocks of said preliminary background model than others of said alternate blocks.

27. The apparatus of claim 26, wherein said alternate blocks are larger than said blocks.

28. The apparatus of claim 27, wherein said alternate blocks in said images are overlapping.

29. The apparatus of claim 28, wherein said stitcher smooths overlapping regions of said alternate blocks in said panorama background.

30. The apparatus of claim 29, wherein said sticher smooths said overlapping regions using a weighted blending technique.

31. The apparatus of claim 22 wherein said selected background blocks have overlapping regions and said sticher smooths said overlapping regions.

32. A computer-readable medium including a computer program for generating a panorama background from a set of images, said computer program comprising:
  computer program code for dividing each of said images into blocks;
  computer program code for comparing color-space features of corresponding blocks of said images to select background blocks from foreground and background blocks; and
  computer program code for comparing color-space features of corresponding blocks of said images to select background blocks; and
  computer program code for merging said selected background blocks to generate said panorama background.

33. The computer-readable medium of claim 32, wherein said dividing step includes dividing each of said images into blocks having overlapping regions; and
  computer program code for smoothing said overlapping regions of said selected background blocks to generate said panorama background.

* * * * *